United States Patent

Walker

[15] 3,652,860

[45] Mar. 28, 1972

[54] RADIATION SENSITIVE ANALYTICAL CENTRIFUGE

[72] Inventor: Peter Martin Brabazon Walker, Lasswade, Scotland

[73] Assignee: MSE Holdings Limited, Sussex, England

[22] Filed: June 29, 1970

[21] Appl. No.: 50,426

[30] Foreign Application Priority Data

June 27, 1969 Great Britain..........................32741/69

[52] U.S. Cl.................................250/218, 356/197, 210/234
[51] Int. Cl........................................................G01n 21/26
[58] Field of Search..................250/218, 232, 234, 83.3 UV; 356/196–198

[56] References Cited

UNITED STATES PATENTS

| 3,518,012 | 6/1970 | Franklin et al.......................250/218 X |
| 3,322,023 | 5/1967 | Rottmann..............................356/197 |
| 2,989,891 | 6/1961 | Rockafellow........................356/196 X |
| 3,013,466 | 12/1961 | Kaye....................................250/232 X |

Primary Examiner—Walter Stolwein
Attorney—Waters, Roditi, Schwartz & Nissen

[57] ABSTRACT

An analytical centrifuge comprises a cell scanning system having a radiation input arrangement having a slit defining a beam of radiation of elongate section directed at a cell so that the length direction of the section is at right angles to the rotor radius, there being means for displacing the beam stepwise for radiating successive radially displaced zones of the cell.

11 Claims, 2 Drawing Figures

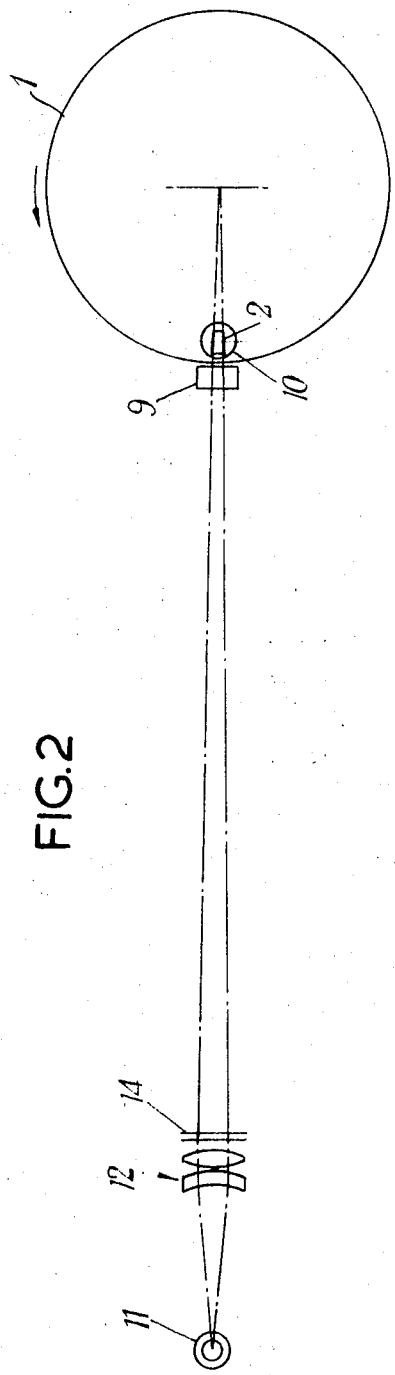

RADIATION SENSITIVE ANALYTICAL CENTRIFUGE

BACKGROUND OF THE INVENTION

This invention relates to analytical centrifuges, that is, centrifuges having means for sensing the radiation transmissive properties of material whilst it is being subjected to centrifugal forces in the centrifuge.

In an analytical centrifuge, the radiation transmissive rotor cell containing material to be tested can be illuminated with radiation to measure the absorption or transmission of the radiation, for example by the use of a photo-cell. One can illuminate the whole rotor cell area and then inspect with the photo-cell individual portions of it so that the properties of distinct zones of the rotor cell can be separately measured. Thus, one can use a scanning slit interposed between the rotor cell and the photo-cell. To achieve an adequate system by these means requires the generation of collimated light to illuminate the whole rotor cell and the optics necessary are unavoidably expensive. Moreover, the presence of the slit downstream of the cell means that only a portion of energy passing through the cell reaches the photo-cell, so that there is an unavoidable loss of sensitivity.

It is an object of the present invention to overcome these disadvantages.

SUMMARY OF THE INVENTION

According to the present invention there is provided an analytical centrifuge having a cell scanning system comprising a radiation input arrangement arranged to direct radiation to and through a cell of the centrifuge, this arrangement being operable to form a beam of radiation of elongate section the length direction of which section extends, at the rotor, substantially normal to a radial line extending from the axis of rotation of the centrifuge rotor, and including means for moving said beam in a direction at an angle to the length direction of its section.

In this way, all the radiation of the beam can be focused at the cell and all of that radiation which passes through the cell can be utilized. This entails a simpler optical system and an increased sensitivity.

In one embodiment, the beam is moved stepwise, so as to adopt a plurality of successive stationary positions each of which may be held for one or more revolutions of the rotor.

The radiation input arrangement may have means defining a radiation transmissive slit to form said elongate beam. Said means may therefore be movable in a direction at an angle to the length direction of its slit, thereby to produce the required movement of the beam.

In one such embodiment, the radiation input arrangement defines a radiation input path which extends from the slit to a prism, from the prism to a spherical mirror or other image forming means and from the mirror in a direction substantially parallel to the rotor axis through the cell. That portion of the path which extends from the slit to the prism might, for example, be substantially at right angles to the rotor axis.

The centrifuge is preferably designed for ultraviolet radiation but it must be appreciated that other forms of radiation could be used instead.

BRIEF DESCRIPTION OF THE DRAWINGS

For a better understanding of the invention and to show how the same may be carried into effect, reference will now be made by way of example, to the accompanying drawings, in which:

FIG. 2 is a diagrammatic representation of the centrifuge of FIG. 1 in plan.

DESCRIPTION OF EMBODIMENTS

Figure 1:
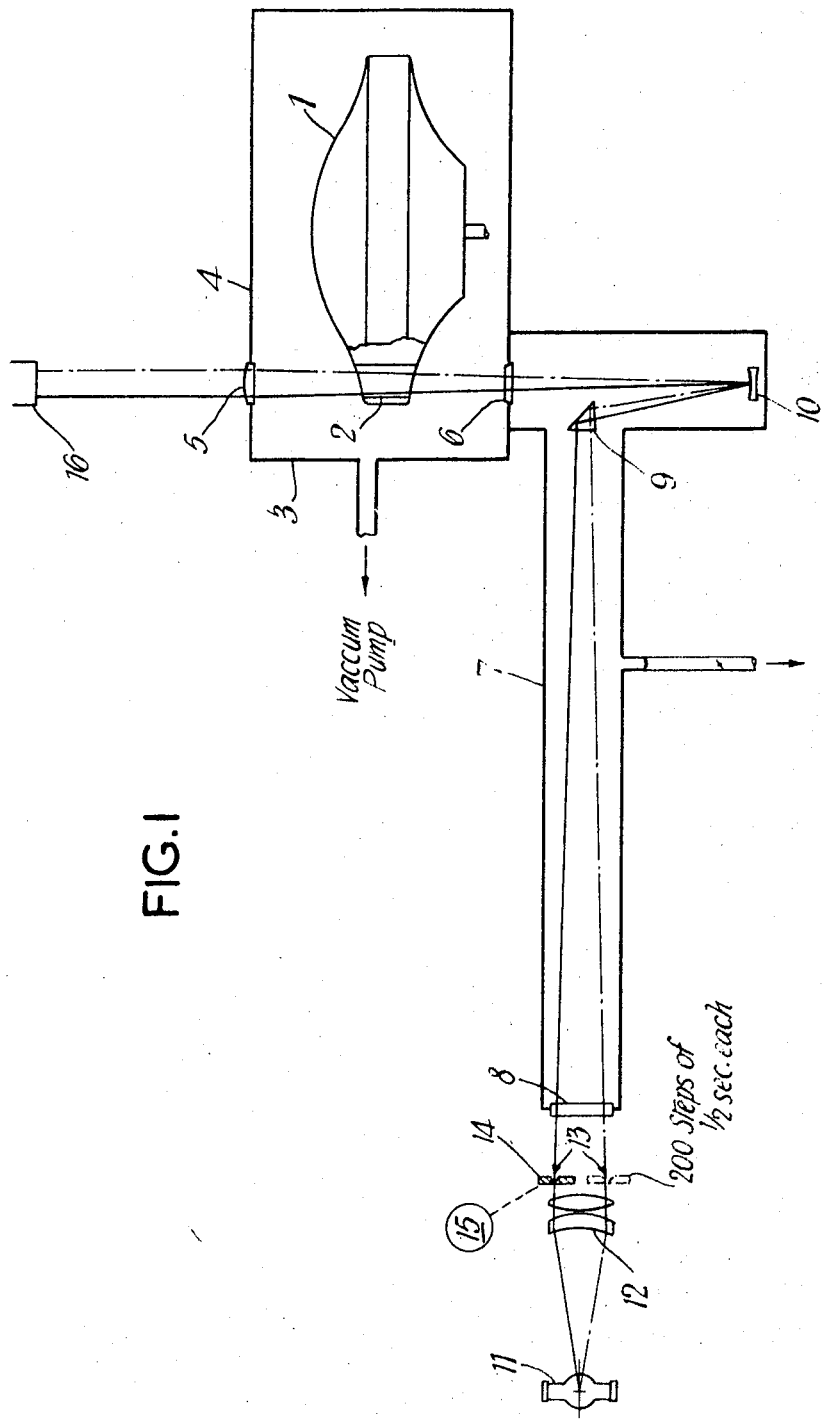
FIG. 1 is a diagrammatic representation of an analytical centrifuge in elevation with an ultraviolet scanning system.

FIG. 1 and 2 diagrammatically illustrate an analytical centrifuge comprising an analytical rotor 1 having at least one circular (FIG. 2) compartment 2 to receive a wedge shaped cell containing a sample to be analysed. The rotor is contained in a bowl 3 having a cover 4 and defining an evacuated enclosure for the rotor. On the same radius as the compartment 2, the cover has a collecting lens 5 and the bowl an optically flat window 6 defining an optical path through the enclosure and the rotor compartment. The centrifuge further comprises a vacuum enclosure 7 having an optical inlet provided by an optically flat window 8 and an optical outlet provided by window 6. An optical path is defined between the windows by an adjustable prism 9 and an adjustable part-spherical mirror 10.

Leading to the inlet side of the enclosure 7 is an optical path extending from an ultra-violet source 11 through a condensing lens assembly 12 and through a slit 13 in a member 14. The slit extends horizontally to form a beam having an elongate section the length direction of which is normal to the radius of the rotor 1 when passing through the compartment 2. The beam is focused on to the mirror 10.

The member 14 is coupled to a stepping motor 15 operable to hold the member stationary, say for one-half second, in each of a plurality, say 200, of successive vertically spaced positions. When the member is in the illustrated uppermost position the formed beam of radiation extends along the illustrated uppermost path into the enclosure 7 thereby to be positioned at the radially outermost region of the compartment. The reverse applies when the member is at its lower-most position illustrated in dotted lines. The limits of the beam position are illustrated by the line in FIG. 1 which limit the optical path.

A monochromator or filter may be positioned downstream of the correcting lens 5 or at any suitable position to obtain a specific wavelength from the beam.

Finally, a photo-detector 16 (FIG. 1), such as a photomultiplier, is positioned to receive the light which has passed through the compartment 2 and the lens 5.

I claim:

1. An analytical centrifuge comprising:
   a rotor defining a radiation transmissive cell;
   radiation sensing means for sensing radiation which has passed through said cell;
   a radiation input arrangement for directing radiation at said cell;
   means of said radiation input arrangement defining a radiation transmissive movable slit to form a beam of radiation of elongate section the length dimension of which extends, at the said rotor, substantially normal to a radial line extending from the axis of rotation of said rotor;
   image forming means for forming an image of said slit at said cell; and
   said movable slit comprising means for displacing said beam in a direction at an angle to the length direction of its section to traverse said beam with a component of motion radially of said cell.

2. An analytical centrifuge as claimed in claim 1, wherein said means defining said slit are movable in a direction at an angle to the length direction of said slit to produce the movement of the beam.

3. An analytical centrifuge as claimed in claim 1, and comprising means for moving said beam step-wise.

4. An analytical centrifuge as claimed in claim 2, and comprising a stepping motor coupled to said means defining said slit for moving said beam stepwise.

5. An analytical centrifuge as claimed in claim 1 wherein said angle is about 90°.

6. An analytical centrifuge as claimed in claim 1, wherein said image forming means is arranged to direct said beam substantially parallel to the axis of said rotor to and through said rotor cell, and means for focusing said beam on to said image forming means.

7. An analytical centrifuge as claimed in claim 6, wherein a prism is disposed on the optical path of said input arrangement to deflect said optical path to said image forming means.

8. An analytical centrifuge as claimed in claim 7, wherein a portion of said optical path extending to said prism is substantially at right angles to a portion of said optical path extending through said rotor.

9. An analytical centrifuge as claimed in claim 7, wherein said prism and said image forming means are enclosed in an evacuated enclosure sealed from said rotor.

10. An analytical centrifuge as claimed in claim 9, wherein said rotor is contained in an evacuable bowl defining a space distinct from said enclosure.

11. An analytical centrifuge as claimed in claim 1, wherein said radiation sensing means is a photo-multiplier

* * * * *